United States Patent
De Loor

(10) Patent No.: US 9,939,633 B2
(45) Date of Patent: Apr. 10, 2018

(54) FLAT FIELD TELECENTRIC SCANNER WITH DIFFRACTION LIMITED PERFORMANCE

(75) Inventor: Ronny De Loor, Ghent (BE)

(73) Assignee: Next Scan Technology BVBA, Evergem (BE)

( * ) Notice: Subject to any disclaimer, the term of this patent is extended or adjusted under 35 U.S.C. 154(b) by 213 days.

(21) Appl. No.: 14/007,832

(22) PCT Filed: Mar. 30, 2012

(86) PCT No.: PCT/EP2012/055749
§ 371 (c)(1),
(2), (4) Date: Sep. 26, 2013

(87) PCT Pub. No.: WO2012/131015
PCT Pub. Date: Oct. 4, 2012

(65) Prior Publication Data
US 2014/0009811 A1    Jan. 9, 2014

(30) Foreign Application Priority Data

Mar. 31, 2011  (EP) .................................... 11160661

(51) Int. Cl.
*G02B 26/08*  (2006.01)
*G02B 26/10*  (2006.01)
(Continued)

(52) U.S. Cl.
CPC ......... *G02B 26/10* (2013.01); *G02B 13/0005* (2013.01); *G02B 13/22* (2013.01); *G02B 26/126* (2013.01)

(58) Field of Classification Search
CPC ........................... G02B 26/08; G02B 26/0816; G02B 26/0833; G02B 26/0841; G02B 26/085;
(Continued)

(56) References Cited

U.S. PATENT DOCUMENTS 5,168,386 A * 12/1992 Galbraith ............. G02B 26/105
                                                                  359/208.1
5,751,464 A    5/1998 Yoshikawa
(Continued)

FOREIGN PATENT DOCUMENTS

EP        1701197 A2      9/2006

OTHER PUBLICATIONS

PCT International Search Report and Written Opinion, PCT/EP2012/055749, Jun. 21, 2012, 13 Pages.
(Continued)

*Primary Examiner* — Mustak Choudhury
(74) *Attorney, Agent, or Firm* — Fenwick & West LLP

(57) ABSTRACT

The present invention provides a scanning system (100) comprising a first port for receiving or emitting a stationary beam (60) of electromagnetic radiation, a second port for emitting or receiving a scanning beam of electromagnetic radiation, the scanning beam scanning in a main scanning direction, a scanning element (61) for relaying the stationary beam (60) into the scanning beam or vice versa, an optical system between the scanning element (61) and the second port, wherein the optical system comprises at least a first mirror (63) and a second mirror (64) having a rotationally symmetric curved mirror surface around their optical axis, at least one of the first and the second curved mirror surface having an aspheric shape, and wherein the first and the second mirror (63, 64) have an off-axis decentered aperture and are offset in position in a direction perpendicular to the main scanning direction.

16 Claims, 9 Drawing Sheets

(51) Int. Cl.
   *G02B 26/12* (2006.01)
   *G02B 13/00* (2006.01)
   *G02B 13/22* (2006.01)

(58) Field of Classification Search
   CPC ............. G02B 26/0858; G02B 26/0866;
   G02B 26/10; G02B 26/101; G02B
   26/105; G02B 26/12; G02B 26/126;
   G02B 26/127; G03F 7/702; G03F
   7/70233; B29C 67/0066; B29C 67/0085;
   B23K 26/04; B23K 26/0081; B23K
   26/064; B23K 26/067; B23K 26/342;
   B41J 2/471
   USPC ......... 359/196.1–226.3, 207.2, 208.1, 207.1,
   359/858; 347/256–261; 250/216,
   250/234–236; 353/39, 98–99
   See application file for complete search history.

(56) References Cited

U.S. PATENT DOCUMENTS

| 5,757,535 | A |   | 5/1998 | Ichikawa |            |
|-----------|---|---|--------|----------|------------|
| 6,022,115 | A |   | 2/2000 | Borra    |            |
| 6,078,419 | A | * | 6/2000 | Atsuumi  | G02B 26/126 |
|           |   |   |        |          | 359/207.1   |
| 2003/0112485 | A1 | * | 6/2003 | Nishihata | G02B 26/126 |
|           |   |   |        |          | 359/207.2   |
| 2009/0051890 | A1 | * | 2/2009 | Mann     | G03F 7/70233 |
|           |   |   |        |          | 355/67      |

OTHER PUBLICATIONS

Korean Office Action, Korean Application No. 10-2013-7028910, dated Apr. 17, 2017, 5 pages. (with concise explanation of relevance).

* cited by examiner

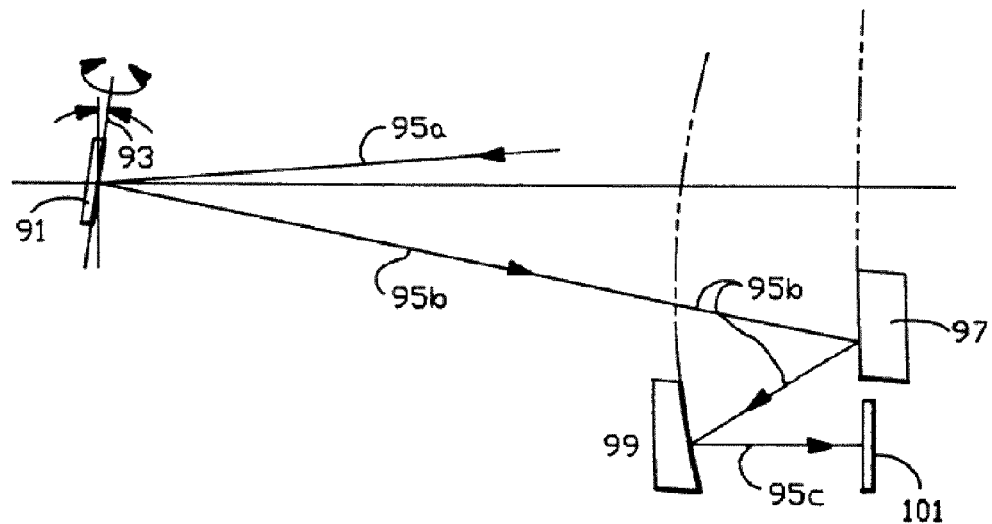
FIG. 1 – PRIOR ART
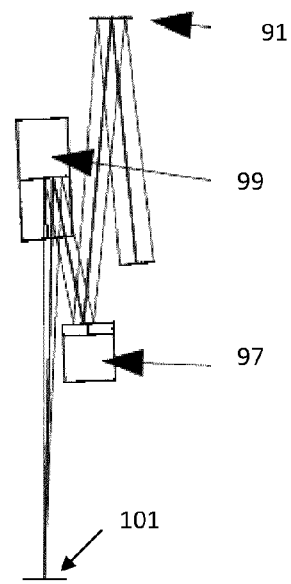
FIG. 2 – PRIOR ART

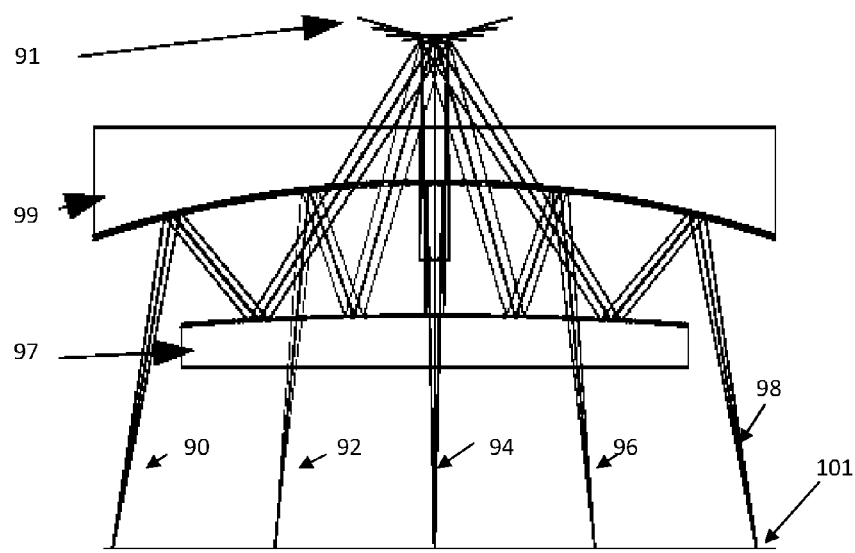
FIG. 3 – PRIOR ART
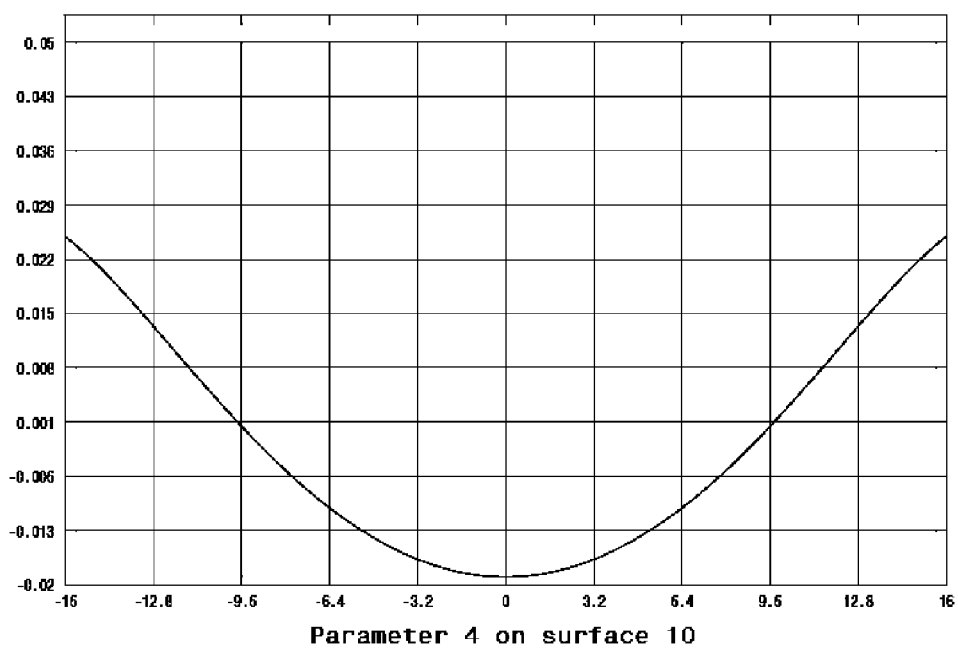
FIG. 5 – PRIOR ART

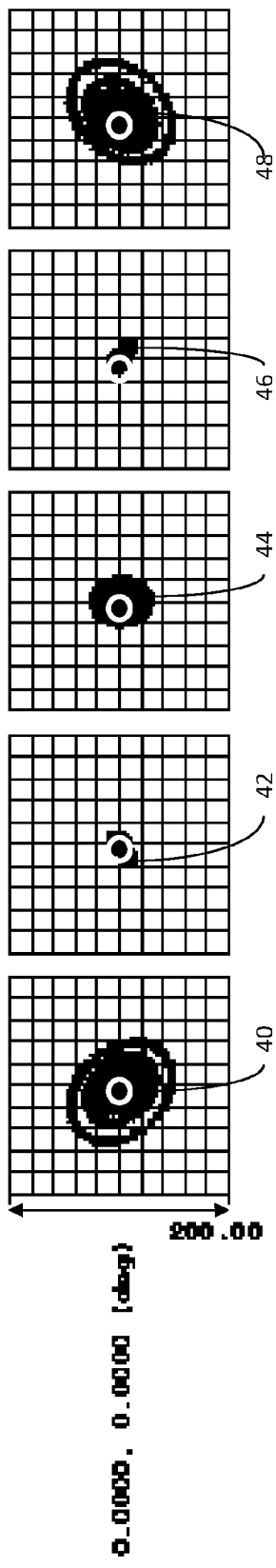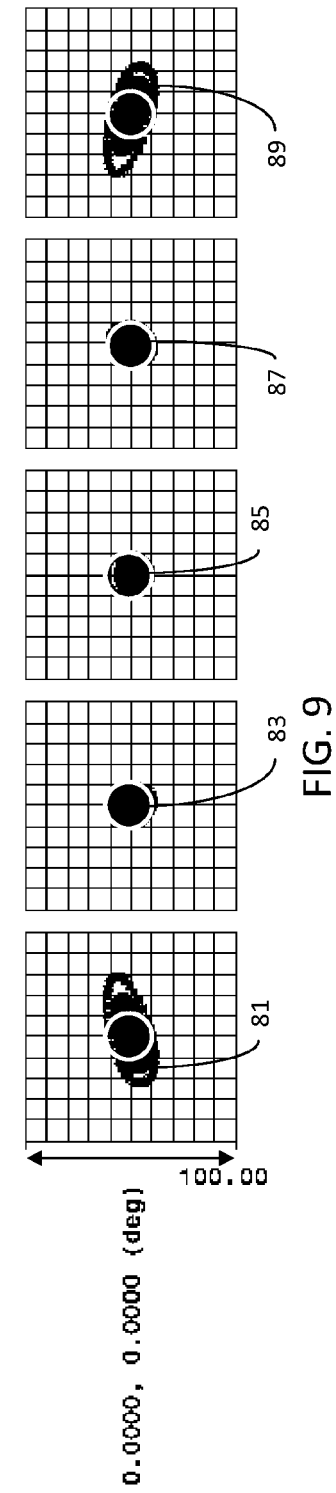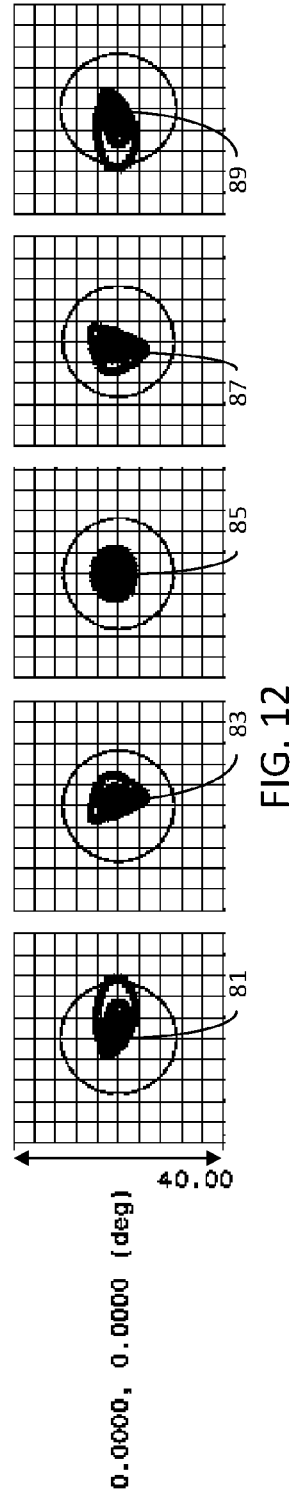

FLAT FIELD TELECENTRIC SCANNER WITH DIFFRACTION LIMITED PERFORMANCE

FIELD OF THE INVENTION

The present invention relates to optical systems for scanning or deflecting a radiation beam, and in particular to beam scanners which use a deflector, e.g. a rotationally moving reflective scanning element, such as a galvanometer scanner (also called galvo), an oscillating mirror, a rotating polygon or a stationary transmissive (or reflective) scanning element such as an (optionally integrated) electro-optic scanner.

BACKGROUND OF THE INVENTION

Laser printers, laser based rapid prototyping equipment and laser (micro) machining centers and the like make use of a precision focussed laser beam that is scanned across a flat scan surface along a straight line path. A typical optical scanning system for this purpose employs a rotating or oscillating flat mirror to deflect the incoming (collimated) optical beam. The (collimated) beam is aimed at the scanner mirror's rotational axis, so that the deflected beam sweeps a plane in space. The beam thus strikes the flat scan surface in a spot that scans along a straight line path. In order to focus the scanning beam onto the flat scan surface, and to ensure that the focussed spot location has a linear relation to the mirror deflection angle, the deflected beam passes a so called f-theta objective. The f-theta objective can be a (multi) lens element system or a catadioptric system comprising both lenses and mirror elements.

Wafer defect and document scanners also incorporate a scanning element and an f-theta objective, either these systems are used to relay the light, provided by an illuminating source, reflected (or transmitted) by a small spot on the object of interest through the f-theta lens and the scanning element towards a stationary photodetector. The signal generated by the photodetector provides information on the status of the object at that specific observed spot location. When the scanner is operating the spot location under observance is moving versus the objective. This type of scanners is used to provide data at very high resolving power (>10000 pixels per line), where (line) cameras are not providing the performance required.

In some systems (so called co-axial) systems both the illuminating beam and the reflected light beam pass through the scanner system. A dedicated beam splitter at the conjugate side of the scanned path splits the illuminating and reflected light beams.

The design of f-theta objectives is straightforward and many designs are commercially available. For laser material processing a typical f-theta objective has a focal length of 80 to 256 mm. These designs achieve reasonable performance for (optical) beam deflection angles of up to about 18 degrees. For laser beam scanners, the minimal focussed spot size that can be achieved is determined by the diameter of the input collimated beam and the focal length of the f-theta objective. The length of the scanned path is then determined by the same focal length and the maximum deflection angle the objective can handle. Typical operating parameters for a commercially available system are for example beam diameter 10 mm, laser wavelength 532 nm, focal length of the objective 160 mm, length of the scanned path 110 mm, and focussed spot TEM00 diameter of 17 µm.

Commercially available compact f-theta lenses as described above have some major drawbacks when used for laser material processing. Laser material processing is often of ablative nature and require a threshold energy density level (J/cm$^2$) in the laser beam before any processing is starting. For most applications the threshold energy density level is to be kept constant across the scanned path within very narrow margins. With compact f-theta lenses the radiation-material interaction changes considerably across the scanned path: in the middle the focussed spot is circular, but at the extremities of the scanned path the spot shape is elliptical. This is caused by the fact that the beam impinges on the flat scan surface in non-perpendicular conditions. As said before, the maximum deflection angle is usually about 18 degrees, which causes the spot to grow by about 5% at the extremities of the scanned path. Since the total beam energy is the same in the middle and at the extremities of the scanned path, the peak energy density of the beam will drop at the extremities of the scanned path, because of the larger beam size. Inevitably this will be seen on the processed surface.

To overcome this negative effect, a telecentric f-theta objective may be used. In a telecentric objective, the chief ray of the focussed laser beam is always perpendicular to the flat scan surface, across the complete scan. Telecentric f-theta objectives are for example described in U.S. Pat. No. 4,863,250 and U.S. Pat. No. 4,880,299 and are commercially available, but unfortunately they are much more expensive than standard f-theta objectives since they usually have more optical elements and the last optical element must be larger in diameter than the scanned path. This is the main reason why those commercially available telecentric f-theta objectives are limited to a 50 mm scanned path.

To lower the cost, telecentric systems using at least one mirror surface have been designed. Mirrors have a cost advantage over lens elements above a certain element size, e.g. in case lens elements would become larger than 100 mm. Such telecentric systems have for example been described in U.S. Pat. Nos. 5,168,386. 5,168,386 describes, as illustrated in FIG. 1, a flat field telecentric scanner including a planar scan deflector 91 moveable about a scan axis 93 and placed in the path of an incident light beam 95*a*. Two off-axis mirrors 97, 99 in series in the path of the scanning light beam 95*b* reflected from scan deflector 91 produce a telecentric scan of the light beam 95*c* incident on a target surface in an image plane 101. Mirror 97 is a weak spherical convex mirror, and mirror 99 is a spherical concave mirror. A basic characteristic of this design is that most of the focusing action is taken up by a lens (or other focusing system) in front of a scan deflector 91, and that the post deflector optics 97, 99 function as a field flattener. Besides scanning and field flattening the optical system must also focus the beam to a sufficiently small, preferably diffraction limited spot. This means that the optical aberrations in the overall optic design must be kept low. Optical systems having wave front aberrations lower than a quarter wave, or having a calculated ray traced spot size smaller than the Airy spot, are usually considered diffraction limited. The embodiment disclosed, with two spherical mirrors in series in the path of the scanning light beam 95*a*, 95*b*, 95*c* is indicated not to have enough degrees of freedom to produce a flat-field telecentric scanner where all aberrations are controlled. In particular, astigmatism (i.e. rays of light beams propagating in two perpendicular planes having different foci) cannot be made negligible in this simple system.

This is illustrated in FIG. 2 to FIG. 5. FIG. 2 shows a side view of a telecentric system using spherical mirror surfaces as in FIG. 1, while FIG. 3 shows a front view thereof. System parameters of the system illustrated are focal length=190 mm, scan width=170 mm, diffraction limited spot $1/e^2$ diameter 14 µm at 354 nm wavelength. In the illustration of FIG. 3, light paths 90, 92, 94, 96, 98 are shown for five different positions of the scan deflector 91. FIG. 4 shows a corresponding spot diagram on the image plane 101. Five spots 40, 42, 44, 46, 48 can be seen, as created by the light beams following the light paths 90, 92, 94, 96, 98, respectively. The white circles on top of each spot 40, 42, 44, 46, 48 illustrate the Airy focussed spot diameter of 20,6 µm. It can be seen from FIG. 4 that the actually obtained spot diameter at the image plane 101 is much larger than 20 µm, and furthermore that the spot size over the width of a scan line on the image plane 101 is very variable, the size of the spots 40, 48 at the extremes of the scan line being much larger than 20 µm, the size of the spot 44 at the center of the scan line being larger than 20 µm, but smaller than the size of the spots 40, 48 at the extremes of the scan line, and the size of the spots 42, 46 between the extremes and the center of the scan line being about 20 µm.

FIG. 5 illustrates line bow in function of scan angle. It can be seen that, in this prior art system there is a significant line bow of +25/−20 µm. This is in general considered under par since scanner designers usually strive for a peak to peak line bow smaller than the spot diameter. From FIG. 3 can be seen that the beams 90, 92, 96 and 98 are not impinging perpendicularly on scan surface 101—meaning that the system is only partially telecentric, and not really telecentric as U.S. Pat. No. 5,168,386 would make believe. A system as described in U.S. Pat. No. 5,168,386 can only achieve near telecentricity with a 500 mm focal length lens system, a 200 mm scan width and 20 µm $1/e^2$ spot diameter size. Using a system with longer focal lengths is not advised, since the size of the scanner aperture must be larger to provide for the same small focussed spot size. A longer distance between the scanning element and the scanning plane also negatively influences the accuracy of the scanner, because all angular position errors of the scanner deflector due to mechanical imperfections and/or noise on the control signal are multiplied by this distance to result in focussed spot size location errors.

As described above, telecentricity is a highly desirable feature in scanner systems for material processing. In general system performance of all scanners increases when using a telecentric f-theta lens. However, telecentricity becomes a requirement when inspecting highly reflective surfaces or when using a co-axial illumination/detection system since these systems require the inspection to be carried out at surface perpendicular conditions.

It should further be noticed that material processing using pulsed laser sources puts very stringent demands on the scanner system. In such a system the light pulses from the laser are emitted at a rate determined by the laser oscillator cavity design. In most cases it is not possible to fire a laser pulse at the exact timing of an external trigger signal. Using external trigger signal results in a timing jitter of about one cavity oscillator period (i.e. 20 ns for a 50 MHz optical oscillator). Moreover all light pulses are emitted synchronously to this base optical oscillator period. For slow scanner (<10 m/sec) systems this is in general not a problem since the scanned spot does not move significantly (only 0.2 µm) within the 20 ns period. However, fast scanner systems (>100 m/sec) exhibit a spot movement of more than 2 µm within the 20 ns period. This results in a spot (or pixel) placement error that becomes a significant portion of the system resolution (10 µm).

As a summary, a high performance pulse laser material processing system requires:

A small (<50 µm) and constant (variation <5%) spot size across the scanned surface.

Constant light/material interaction parameters, like incidence angle, beam profile, beam energy level and beam peak intensity across the scanned surface.

A highly linear relation between deflector angle and spot location; this eases the control of the deflection unit. A constant deflection rate (deg/sec) provides for a constant scanning speed (m/sec) and thus for a constant focussed spot location step using a pulsed laser.

A near perfect straight line scan (line bow free), to provide, in combination with the near perfect linearity, for a simple linear spot location relation versus the deflection angle.

A short optical distance between the deflector and the scanned surface to minimize spot location errors propagated by inevitable deflector scan angle noise and jitter. Preferably, the ratio between scanned width and deflector to scanned surface distance is close to or lower than 1. In practice, this demands maximizing the maximum deflection angle, while lowering the focal length of the F-theta lens, the product of these determining the maximum scan width.

High repetition pulsed lasers (>4 MHz pulse rate) demand fast and wide scanners (>10 m/sec) to process large surfaces.

Very short pulsed (sub nanosecond) lasers require pulse dispersion free optics. The first two requirements are provided by a diffraction limited telecentric scanner system.

U.S. Pat. No. 6,022,115 describes an optical scan system for measurement of a three dimensional device. The optical system is designed and configured to meet telecentric and f-θ requirements. The system employs primary and secondary mirrors operating in conjunction with a tertiary deflector mounted on a pivot. Light from a light source produces a beam which is deflected off the deflector and the secondary and primary mirrors, respectively. The primary and secondary mirrors may be rotationally symmetric aspheres, whereby the incoming light, the moving scan light and the optical axes of the mirrors are all lying in a same plane. It is a disadvantage of such system that one of the mirrors blocks the light path, such that the scan can only be done in part of a plane. The cost of the mirror is largely defined by its size, hence making a large mirror of which only half may be used is very expensive. Even if this large mirror would be cut into two, thus generating two mirrors for the same price, large machinery is required, which is rather rare.

US2003/0112485 describes a light scanning system which causes a light spot to scan a surface at a constant speed. The light scanning system includes a light source radiating a light bundle, a deflector which deflects the light bundle, a line image imaging optical system which images the light bundle on a deflecting surface of the deflector as a line image, and a scanning/imaging optical system which images the deflected light bundle on the surface as a light spot. The scanning/imaging optical system consists of a first aspheric mirror which is symmetric with respect to an axis of rotation and is disposed on the light inlet side and a second aspheric mirror which is anamorphic and is disposed on the light outlet side.

The use of anamorphic and toriodal mirrors is discouraged because of the very high manufacturing cost in near diffraction limited systems, larger (>70 mm) optical elements and low volume manufacturing.

SUMMARY OF THE INVENTION

It is an object of embodiments of the present invention to provide a good telecentric scanner. It is an object of embodiments of the present invention to provide a simple, low-cost, highly linear, flat-field telecentric scanner that has diffraction limited performance.

The above objective is accomplished by a device and a method according to the present invention.

In a first aspect, the present invention provides a scanning system comprising a first port (P1) for receiving or emitting a stationary beam of electromagnetic radiation, a second port (P2) for emitting or receiving a scanning beam of electromagnetic radiation, the scanning beam scanning in a main scanning direction, a scanning element for relaying the stationary beam into the scanning beam or vice versa, and an optical system between the scanning element and the second port, wherein the optical system comprises at least a first mirror and a second mirror having a rotationally symmetric curved mirror surface about their optical axis, at least one of the first and the second curved mirror surface having an aspheric shape, and wherein the first and the second mirrors have an off-axis decentered aperture and are offset in position with respect to one another in a direction perpendicular to the main scanning direction.

The off-axis decentered aperture of the first and the second mirror is the portion where in use electromagnetic radiation is reflected, and which is not symmetric to the optical center i.e. the point where the axis of rotational symmetry or optical axis intersects the mirror. The first and the second mirrors are shaped such that the axis of rotational symmetry of these mirrors is not located in the middle of—or may even be located outside the portion where in use electromagnetic radiation is reflected. Mirrors with the optical center outside the aperture may be manufactured in symmetric pairs, two at a time, which again reduces costs.

Compared to prior art solutions with anamorphic or toroidal mirrors, by limiting the optical system to rotationally symmetric curved shapes, inherently a number of performance requirements will not be met anymore. Typically this would be compensated for by using more surfaces. In accordance with embodiments of the present invention, despite the use of less complex surfaces, a solution has been found for providing a telecentric scanner with good properties, by using off-axis rotationally symmetric aspheric mirrors which are offset in position with respect to one another in a direction perpendicular to the main scanning direction.

In a scanning system according to embodiments of the present invention, the shape of the first and second mirrors may be optimized for telecentricity less than 5 degrees and line bow less than +20/−20 µm for mechanical scan angles of +/−16 deg, and a spot size variation less than 5%.

In embodiments of the present invention, the other one of the at least one first and second curved mirror surface has a spherical shape. In alternative embodiments, the other one of the at least one first and second curved mirror surface also has an aspheric shape. This means that the optical system according to embodiments of the present invention can comprise a combination of an aspherical and a spherical mirror, or a combination of two aspherical mirrors. In particular embodiments of the present invention, the optical system consists of the first mirror and the second mirror. This is an advantageous embodiment as the optical system does not comprise other elements than these two mirrors, thus being a solution with least elements. A scanning system according to this embodiment is easy to manufacture.

In a scanning system according to embodiments of the present invention, the optical system may furthermore comprise at least one further mirror, for example for folding the optical path in the optical system. Such further mirror may optionally be a plane mirror.

A scanning system according to embodiments of the present invention may furthermore comprise a radiation source for generating the stationary beam of electromagnetic radiation for being received by the first port. Such radiation source may be used for generating a beam of radiation, e.g. a light beam, to be sent to the scanning element. It is advantageous for embodiments of the present invention to use short pulsed (e.g. nano-, pico- and femto-second) radiation sources for use in micromachining applications.

A scanning system according to embodiments of the present invention may furthermore comprise an optical subsystem near the first port, comprising at least one optical element for adapting the diameter and divergence of the stationary beam of electromagnetic radiation that is entering the first port in such a way that the scanning beam emitted at the second port is focussed on a scanned surface into a desired spot size. The combination of a pre-focus of the radiation beam emitted by the radiation source, in accordance with the present embodiment, with the optical system according to embodiments of the present invention provides a desired focus on the scan surface.

The aspheric surface of the at least one of the first mirror and second mirror may be described in terms of conic and aspheric terms. In a scanning system according to particular embodiments of the present invention, the position and curvature of the mirrors in the scanning system, the conic and aspheric terms in the description of the aspheric mirror surface(s) and the divergence of the radiation beam at the first port of said optical system may be optimized to provide for a diffraction limited focussed spot quality on a substantially straight scanned path on a scanned surface, and to provide for the spot location along the scanned path having a near perfect linear ratio to a scanning element deflection angle (<0.01%).

In a scanning system according to embodiments of the present invention, the mirror being located closest to the second port may be of the concave type and may have a length comparable to the length of the scanned path. The position and curvature of the mirrors, the conic and aspheric terms in the description of the aspheric mirror surface(s) and the divergence of the radiation beam at the first port may further be optimized to provide for substantially telecentric scanning of the scanned path on the scanned surface.

A scanning system according to embodiments of the present invention may furthermore comprise a substrate having a plurality of points each reflecting, transmitting or emitting electromagnetic radiation as a scanning beam towards the second port; and a detector for detecting radiation emitted as a stationary beam of electromagnetic radiation at the first port.

In embodiments of the present invention, the scanning element may be a reflective system. Alternatively, the scanning element may be a transmissive system.

In particular embodiments, the scanning element may comprise a two-dimensional deflector. The two-dimensional deflector may comprise two cross-directed deflectors. These two cross-directed deflectors can for example be two one-dimensional deflectors one after the other, or they can be physically combined into one device.

In a second embodiment, the present invention provides the use of a scanning system according to the first embodiment of the present invention, for scanning a surface with radiation from a source, e.g. a laser source or a LED source, or for receiving radiation reflected, transmitted or emitted from a scanned substrate. Scanning a surface with radiation from a source may be used for e.g. material processing or illumination of film which changes properties under influence of radiation, e.g. light. Receiving radiation from a substrate may be used for determining properties of the substrate, e.g. transmission properties of the substrate, reflective properties of the substrate, crystal structure of the substrate, wafer defects, . . .

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 1 schematically illustrates a reflective almost telecentric scanner architecture known in the art.

FIG. 2 illustrates a side view of the prior art reflective almost telecentric scanner architecture illustrated in FIG. 1.

FIG. 3 illustrates a front view of the prior art reflective almost telecentric scanner architecture illustrated in FIG. 1.

FIG. 4 shows a spot diagram of the prior art reflective almost telecentric scanner architecture illustrated in FIG. 1 to FIG. 3.

FIG. 5 is a graph illustrating line bow versus scan angle for the prior art scanner architecture as illustrated in FIG. 1 to FIG. 3.

FIG. 9 shows a spot diagram of the reflective telecentric scanner architecture illustrated in FIG. 8.

FIG. 12 shows a spot diagram of the reflective telecentric scanner architecture illustrated in FIG. 11.

Figure 6:
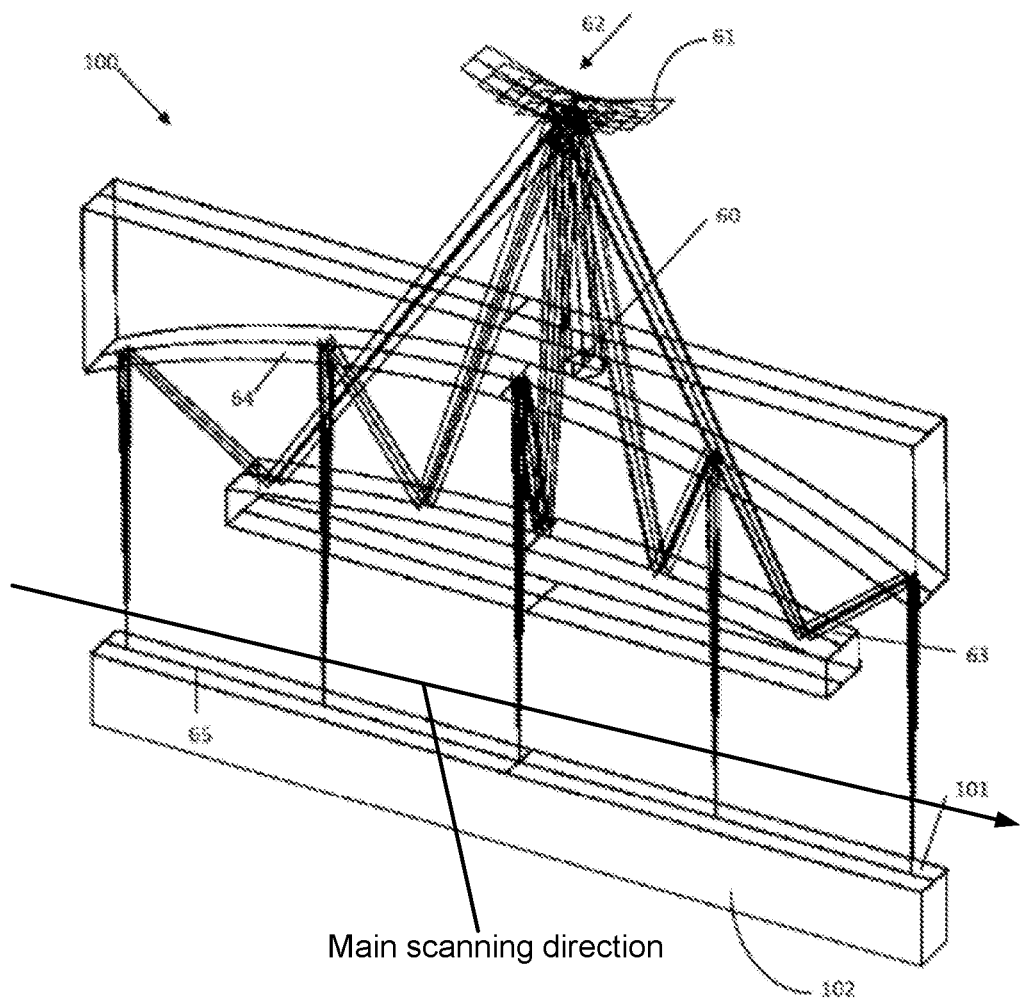
FIG. 6 is a 3D view of a reflective telecentric scanner according to embodiments of the present invention with a 1D deflector.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention relates to optical scanners for scanning or deflecting a beam of electromagnetic radiation, for example, but not limited thereto, a light beam. With "light" in the present invention is meant electromagnetic radiation with a wavelength between 250 and 11000 nm, i.e. visible light, IR radiation, near IR and UV radiation. As examples only, the present invention not being limited thereto, a light source for use with embodiments of the present invention, generating the light beam, may for example be a 266 nm quadrupled UV laser, or a 10600 nm $CO_2$ laser. The present invention in particular relates to beam scanners which use one or more periodically moving reflective scanning elements, such as a galvanometer scanner (also called galvo), an oscillating mirror, a rotating polygon or a stationary transmissive (or reflective) scanning element such as an (optionally integrated) electro-optic scanner, or a combination thereof to form a 2D scanner. The optical scanners disclosed are in particular useful for laser material processing, e.g. using as a source of electromagnetic radiation, a pulsed source of electromagnetic radiation, for example short pulsed lasers (nanosecond pulse duration) to ultra short pulsed lasers (femtosecond pulse duration). However, embodiments of the present invention are not limited to scanners using pulsed sources of electromagnetic radiation; the optical system can be used in combination with a continuous source of electromagnetic radiation such as e.g. CW lasers (and possibly external modulation), even low power lasers, or other light sources (LED, arc lamp) to provide for a high quality cost effective scanner solution.

In the context of the present invention, with "optical axis" is meant a line along which there is some degree of rotational symmetry in an optical system. Another word for "optical axis" is "axis of rotational symmetry".

In the context of the present invention, with "a mirror aperture" is meant that part of the mirror which is actually used. With an "off-axis decentered aperture" is meant that the optical center of the mirror, which is there where the rotational symmetry axis intersects the mirror surface, does not coincide with the center of the aperture, for example does not fall within the aperture, i.e. does not fall within the used portion of the mirror.

An optical scanner according to embodiments of the present invention for scanning a radiation beam, e.g. a light beam, comprises an optical deflector system for scanning an incoming converging beam of electromagnetic radiation, e.g. an incoming light beam, and an optical system disposed between the optical deflector system and a surface to be scanned, for focusing the incoming beam of electromagnetic radiation, e.g. light beam, onto the substantially flat surface to be scanned in a substantially telecentric and bow free way, the scanning motion having a substantially linear position dependency on the deflection angle. The scanning motion takes place in a main scanning direction. The optical system between the optical deflector system and the surface to be scanned comprises at least a first and a second mirror having a first and a second rotationally symmetric curved mirror surface about their optical axis, respectively, whereby at least one of the first and second curved mirror surface has, and optionally both the first and the second curved mirror surface have an aspheric shape. A mirror surface having an aspheric shape is rotationally symmetric around an optical axis of the surface, however, not conforming to the shape of a sphere. Rotationally symmetric aspheric surfaces may be described by a polynomial expansion of the deviation from a conic surface. The first and the second mirror have an off-axis decentered aperture and are offset in position with respect to one another in a direction perpendicular to the main scanning direction. With "perpendicular to the main scanning direction" is meant that the direction of offset at least has a component perpendicular to the main scanning direction. If the direction of offset also has another component, the component in the main scanning direction is larger than the other component.

The optical system of a scanner according to embodiments of the present invention consists of only mirrors. Using only mirror surfaces results in an achromatic optical design, i.e. the scanner optics work for a broad wavelength range. A scanner according to embodiments of the present invention works for wavelengths from 250 nm to 1500 nm, and even in the 10 μm range.

Figure 7:
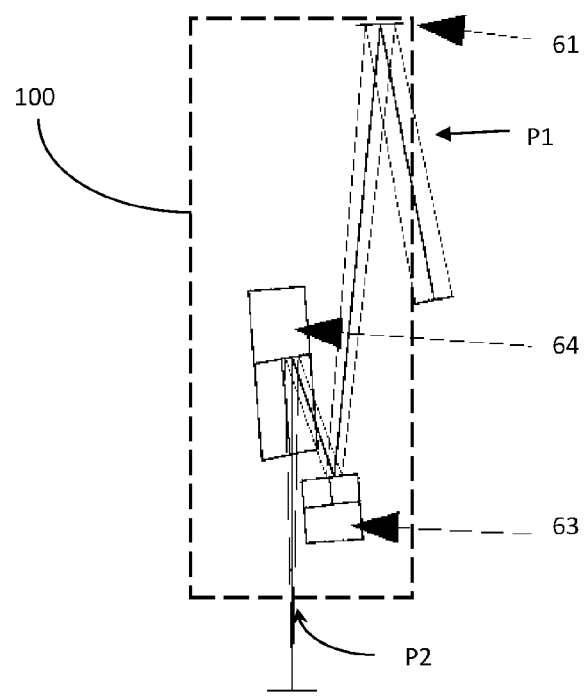
FIG. 7 is a side view of a reflective telecentric scanner according to embodiments of the present invention where the optical system between a deflector and a surface to be scanned consists of two mirrors of which at least one is aspheric.

In FIG. 6 and FIG. 7, one embodiment of an optical scanner according to the present invention is presented. FIG. 6 is a 3D view and FIG. 7 a side view of the scanner. An incoming converging radiation beam, e.g. light beam such as for example laser beam 60, is directed to a deflector system, e.g. a planar deflector surface 61 of for example an oscillating mirror or a rotating polygon, under an input angle a (for clarity reasons not indicated in FIG. 6) to the surface normal of the deflector. The planar deflector surface 61 can be tilted around an axis 62 parallel to the plane of the deflector surface 61, in order to create a scanning motion of the reflected/deflected beam. Because of the input angle a not being zero, the deflected beam describes a cone surface in space, with a top located near the deflector surface 61. The focus point of the converging beam is at a fixed distance behind the deflector surface 61, the fixed distance being determined by the back focal distance of the converging optics minus the optical distance between the last converging element and the deflector system 61. Hence, without further measures, the focussed spot would be moving along an approximate circular arc (this is the intersection of the cone and a sphere with midpoint at the deflector and having radius said fixed distance). In accordance with embodiments of the present invention, a post-deflector two mirror strip f-theta optical system is now used to transform this circular arc path into a straight line path 65. The post-deflector two mirror strip f-theta optical system consists of two curved mirrors 63, 64 which are rotationally symmetric around their optical axis. The two mirrors 63, 64 have an off-axis decentered aperture which may have a rectangular shape. They are off-axis elements, meaning that their optical center is not located in the middle of the used surface, or may even be located outside the used surface."The mirrors 63, 64 are offset in position with respect to one another in a direction perpendicular to the main scanning direction." The combination of the two mirrors 63, 64 can be defined such that the straight line path 65 is scanned on the image plane 101 in a substantially telecentric or telecentric way, whereby the deviation from telecentricity is at most less than a few degrees, e.g. less than 5 degrees, such as less than 2 degrees. With telecentric is meant that the chief ray of the focussed laser beam is always perpendicular to the flat scan surface, across the complete scan line. Obtaining telecentricity requires that at least one of the optical elements is equivalent in size to the scanned path 65. It is preferred to use a concave mirror having a length approximately equal to the length of the scanned path 65 as the element closest to this scanned path, since this leads to a solution with all other elements having dimensions much smaller than the scanned path. According to embodiments of the present invention one or both of the mirrors 63, 64 are of the aspheric type, e.g. of the even aspheric type, such that sufficient aberration minimization, diffraction limited performance is obtained. A mirror of the aspheric type is a mirror having an aspheric reflecting surface, the aspheric surface being rotationally symmetric, however, not conforming to the shape of a sphere. Rotationally symmetric aspheric surfaces may be described by a polynomial expansion of the deviation from a conic surface. An even aspheric surface model uses only the even powers of the radial coordinate to describe the asphericity. An aspheric surface is a non-spherical but still rotationally revolved surface that in contrast to cylinders, toroids or freeforms can be manufactured in high quality at reasonable cost. It is preferred that higher order correction terms are used in the polynomial expansion of the deviation from the spherical surface, hence the aspheric mirror surface is preferably a non-conic aspheric surface. The number of higher order correction terms depends on the target specifications.

In case only one of the mirrors 63, 64 is of the aspheric type, e.g. even aspheric type, it suffices to have a standard spherical shape for the other mirror. Depending on the focussed spot size (system resolution) and wavelength used it is sufficient to have only one aspheric mirror to obtain diffraction limited performance.

In laser scanning system set-ups a beam expander is usually found located between the laser source and the scanner input port. The purpose of having a beam expander in the system is to transform the diameter of the laser source output beam into the required beam diameter at the scanner input port, because the beam diameter at the input port determines the focussed spot size in the focal plane. Usually the beam diameter at the scanner input is larger (>8 mm) than the diameter at the output level of the laser (<2 mm), hence the term 'beam expander'. In classic galvo F-theta set-ups the beam expander is aligned to provide for a collimated beam of required beam diameter at the scanner input port. In the system according to the present invention this beam expander can be aligned to present the converging beam with required diameter and divergence to the scanner input port.

To illustrate the performance enhancements achieved with an optical scanner for scanning a radiation beam, e.g. light beam, according to embodiments of the present invention, the results of a computer analysis using ZEMAX software for optical system design are presented hereinafter for several embodiments of the present invention. The results obtained are compared to the two-mirror design using spherical mirrors as disclosed in U.S. Pat. No. 5,168,386, as illustrated in FIG. 2 to FIG. 5. For the sake of illustration the operating wavelength (354 nm), scan width (170 mm), deflector optical aperture (8 mm) and optical scan angles (−32, −16, 0, 16 and 32 deg) have been kept the same in all scanners considered. Although not shown in the figures, the deviation from the linear condition between scan angle and spot location in the scanned plane (scan linearity) has been kept below 10 µm or 0.006% across the scanned width.

The performance of the scanners in the following embodiments is the result of computer optimization using the position and curvature of the mirror surfaces, the conic and aspheric terms in the polynomial description of the aspheric surface(s), and the input beam divergence as variables in order to obtain a near telecentric, near perfect linear, diffraction limited spot size quality scanner system. As will be seen, depending on the system maximum deflection angles, required focussed spot size, and allowable deviation from perfect telecentricity, this demands for using more aspheric surfaces in the system.

Figure 8:
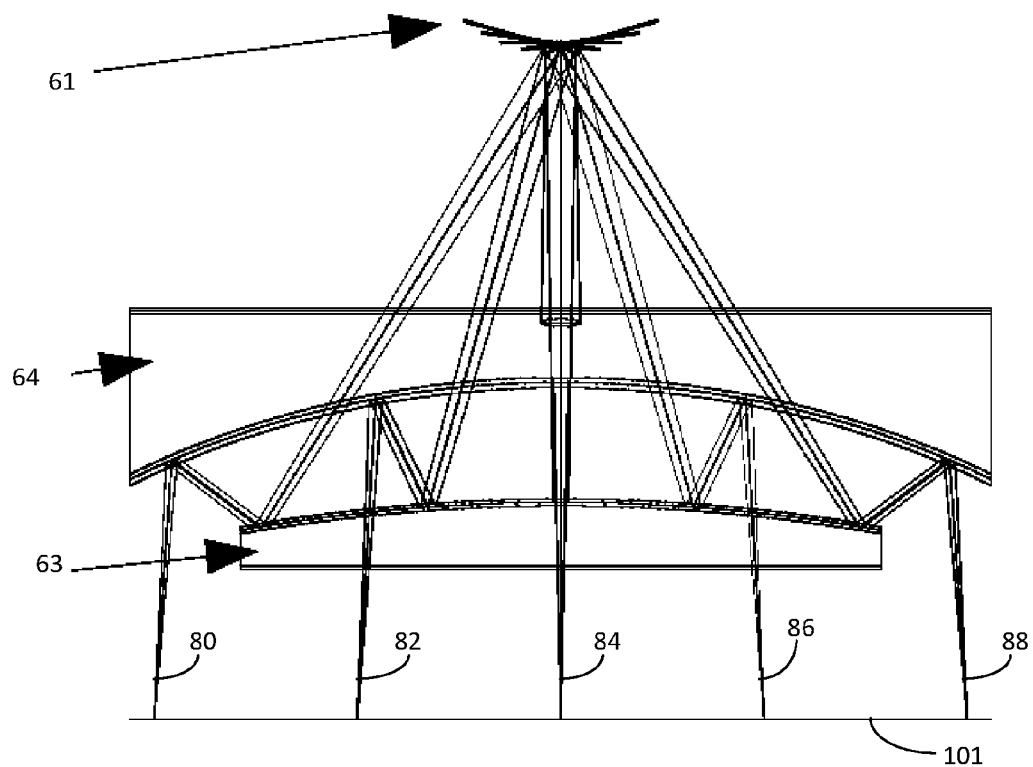
FIG. 8 is a front view of a reflective telecentric scanner according to embodiments of the present invention, where the first mirror is spherical and the second mirror is aspheric.
Figure 10:
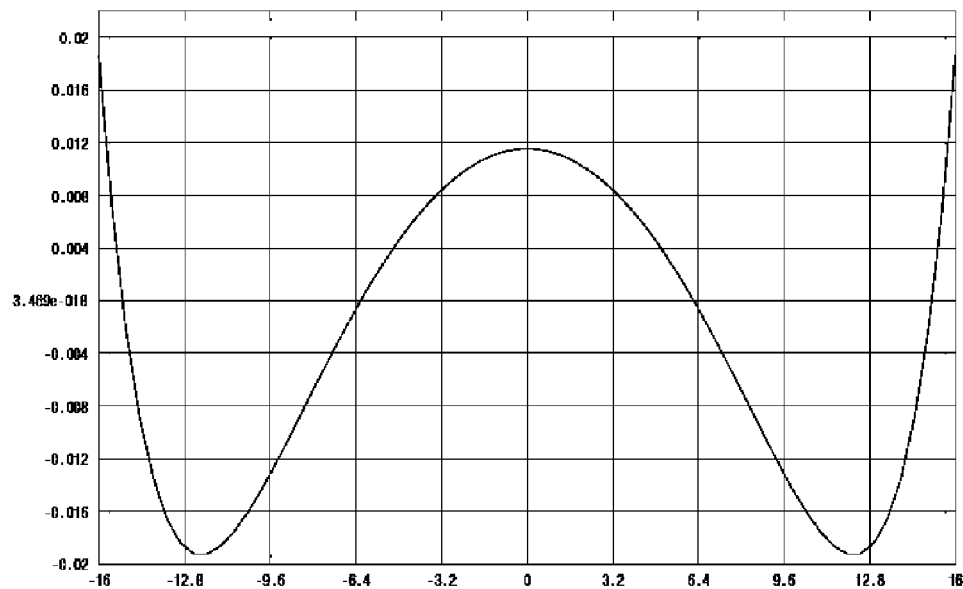
FIG. 10 is a graph illustrating line bow versus scan angle for the reflective telecentric scanner as illustrated in FIG. 8.

FIG. 8 is a front view of an optical scanner according to embodiments of the present invention where the first post deflector mirror 63 is a sphere and the second post deflector mirror 64 is a rotationally symmetric asphere. In the illustration of FIG. 8, radiation paths 80, 82, 84, 86, 88 are shown for five different positions of the scan deflector 61. The performance of this scanner is shown in the related plots in FIG. 9 (spot diagram on the image plane 101) and FIG. 10 (graph of line bow versus scan angle). Five spots 81, 83, 85, 87, 89 can be seen in FIG. 9, as created by the beams of electromagnetic radiation following the radiation paths 80, 82, 84, 86, 88, respectively. The white circles on top of each spot 81, 83, 85, 87, 89 illustrate the Airy spot diameter of 20.6 µm. It can be seen from FIG. 9 that the actually obtained spot diameter at the image plane 101 is about 20 µm, especially at the center spot 85 and the intermediate spots 83, 87. The diameter deviation of the extreme spots 81, 89 from the 20 µm circle is minimal. The line bow, as illustrated in FIG. 10, has slightly improved (compared to FIG. 5) to +15/−20 µm. It can be concluded from FIG. 8 that this scanner according to embodiments of the present invention can achieve good telecentric operation, and for reasonably small scan angles (+/−16 deg) this scanner corrects substantially all aberrations below the diffraction limit. Alternatively this scanner can work at full +/−32 deg optical scan angles with a 4 mm system aperture resulting in diffraction limited performance having a 50 µm $1/e^2$ spot diameter at 354 nm.

Figure 11:
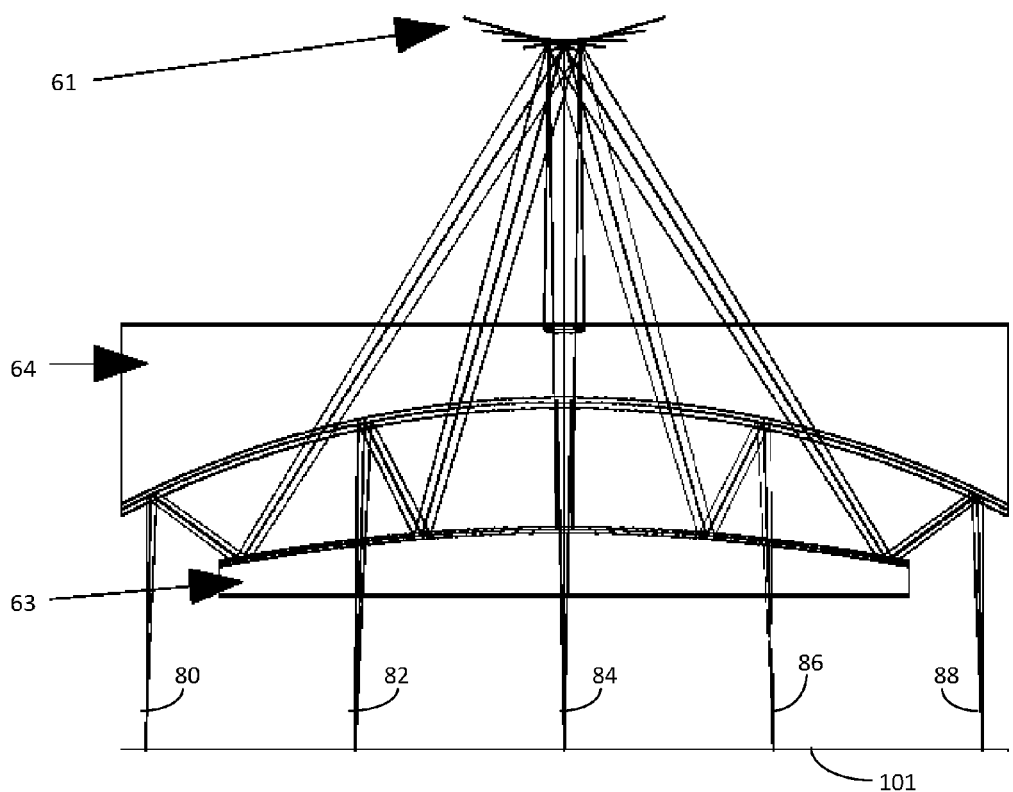
FIG. 11 is a front view of a reflective telecentric scanner according to embodiments of the present invention, where the first mirror is aspheric and the second mirror is spherical.
Figure 13:
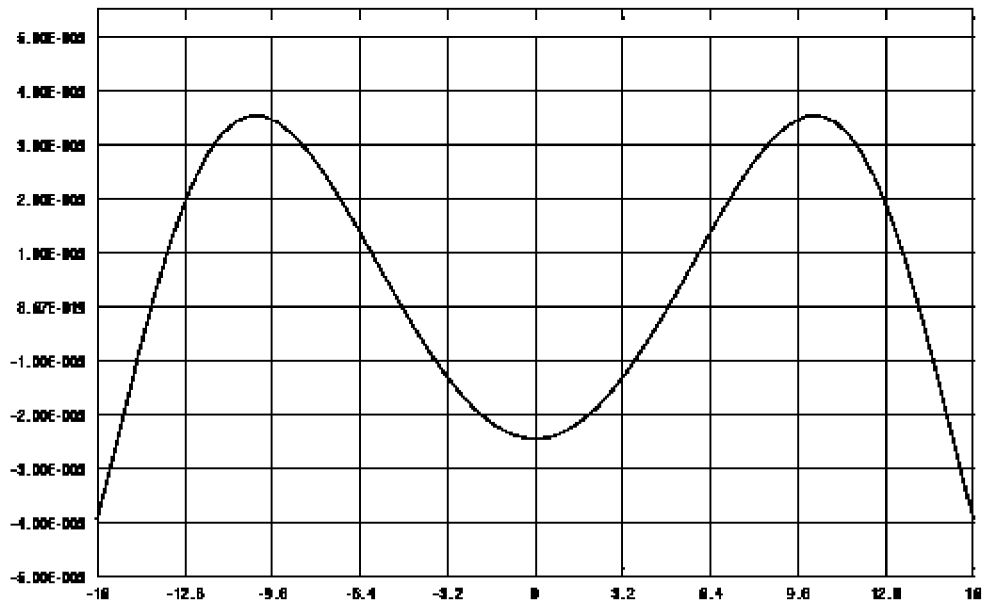
FIG. 13 is a graph illustrating line bow versus scan angle for the reflective telecentric scanner as illustrated in FIG. 11.

FIG. 11 shows a front view of an optical scanner for scanning a radiation beam according to an embodiment of the present invention where the first post deflector 61 mirror 63 is a rotationally symmetric asphere, more particularly in the embodiment illustrated an even asphere, and the second post deflector mirror 64 is a sphere. In the illustration of FIG. 11, radiation paths 80, 82, 84, 86, 88 are shown for five different positions of the scan deflector 61. The performance of this scanner is shown in the related plots in FIG. 12 (spot diagram on the image plane 101) and FIG. 13 (graph of line bow versus scan angle). Five spots 81, 83, 85, 87, 89 can be seen in FIG. 12, as created by the beams of electromagnetic radiation following the radiation paths 80, 82, 84, 86, 88, respectively. The black circles round each spot 81, 83, 85, 87, 89 illustrate the Airy spot diameter of 20 µm. It can be seen from FIG. 12 that the actually obtained spot diameter at the image plane 101 is smaller than 20 µm. The line bow, as illustrated in FIG. 13, has improved a lot (a factor 5 compared to FIG. 5); it is significantly reduced to +/−3 µm. It can be concluded from FIG. 11 that this scanner according to embodiments of the present invention can achieve nearly telecentric operation. This scanner achieves diffraction limited performance over the full optical +/−32 deg scan range.

Figure 14:
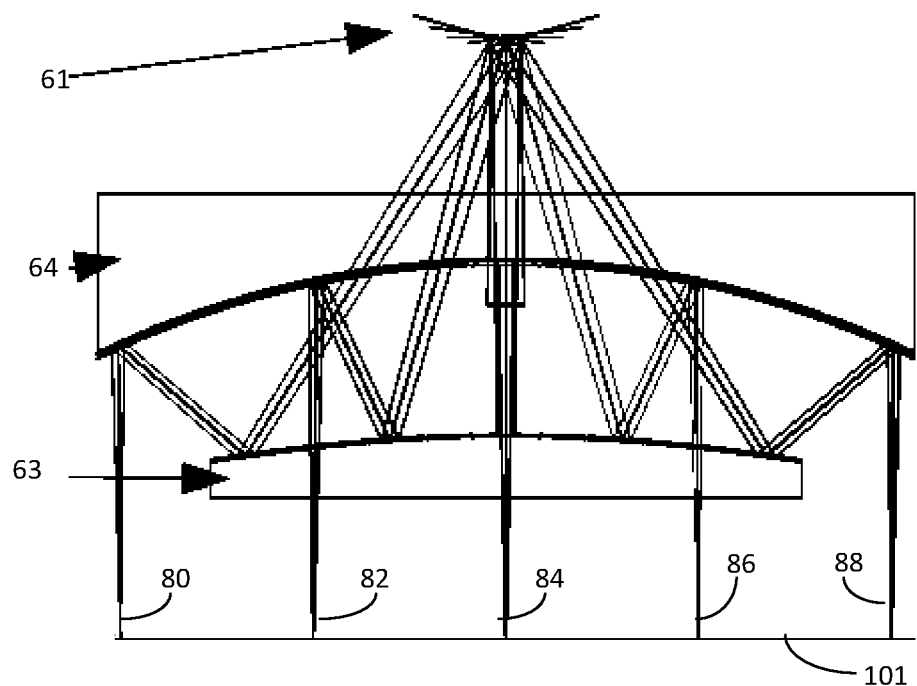
FIG. 14 is a front view of a reflective telecentric scanner according to embodiments of the present invention, where both the first and the second mirror are aspheric.

FIG. 14 shows a front view of an optical scanner for scanning a beam of electromagnetic radiation, e.g. a light beam, according to an embodiment of the present invention where both the first and the second post deflector mirrors 63, 64 are rotationally symmetric aspheres, more particularly in the embodiment illustrated even aspheres. In alternative embodiments of the present invention, not illustrated in FIG. 14, both the first and the second post deflector mirrors could be rotationally symmetric aspheres, of which at least one is not an even asphere. Adding more freedom, such as for example odd terms in the polynomial expansion of the description of the asphere could achieve better theoretical performance; however, at the expense of component manufacturing cost and/or alignment complexity during manufacturing of the system.

Adding more freedom can also be accomplished by adding more mirror surfaces, spherical or aspherical. Adding more mirror surfaces complicates the optical path since in reflective systems the components need to be arranged such that they are not blocking the optical beam traversing the system. Adding one or more spherical mirrors could be considered to 'weaken' the aspherics. Weak aspherics are aspherics that are within a few wavelengths of the spherical shape. Weak aspherics can be produced in a cost effective way in glass starting from a spherical surface and selective polishing of the minor material at the prescribed places, where non weak aspherics generally require a diamond turning production process. Diamond turned surfaces exhibit minor traces of the diamond tool ('lay') and result in a higher surface roughness (5 to 12 nm) than polished surfaces. Polished surfaces are preferred for applications at shorter wavelengths.

It is clear that in systems using more than two mirrors, one (or more) of the mirrors could have a flat surface. These mirror surfaces do not have a optical function rather than folding the optical system in a mechanically speaking more useable (like compact) form. Therefore, flat mirror surfaces are not accounted for when determining the number of mirrors in the f-theta system.

Figure 15:
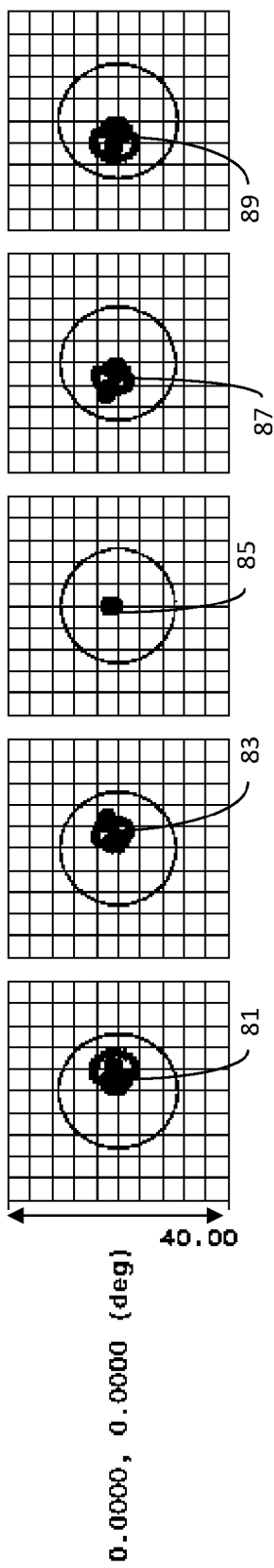
FIG. 15 shows a spot diagram of the reflective telecentric scanner architecture illustrated in FIG. 14.
Figure 16:
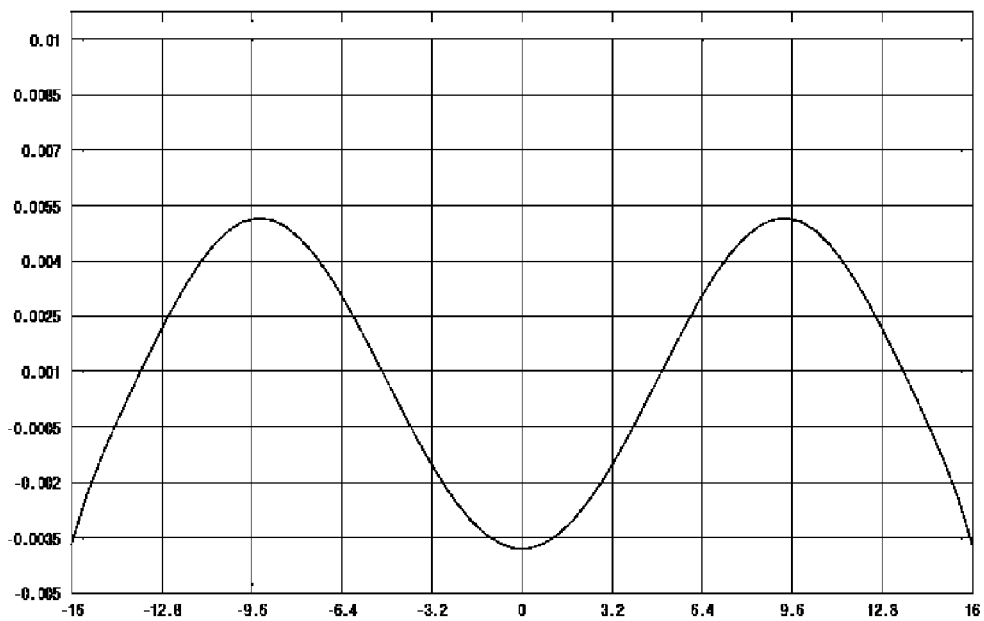
FIG. 16 is a graph illustrating line bow versus scan angle for the reflective telecentric scanner as illustrated in FIG. 14.

In the illustration of FIG. 14, radiation paths 80, 82, 84, 86, 88 are shown for five different positions of the scan deflector 61. The performance of this scanner is shown in the related plots in FIG. 15 (spot diagram on the image plane 101) and FIG. 16 (graph of line bow versus scan angle). Five spots 81, 83, 85, 87, 89 can be seen in FIG. 15, as created by the radiation beams, e.g. light beams, following the radiation paths 80, 82, 84, 86, 88, respectively. The black circles round each spot 81, 83, 85, 87, 89 illustrate the Airy spot diameter of 20 µm. It can be seen from FIG. 15 that the actually obtained spot diameter at the image plane 101 is smaller than 20 µm. The line bow, as illustrated in FIG. 16, has improved a lot (compared to FIG. 5); it is significantly reduced to +5/−5 µm. It can be concluded from FIG. 14 that this scanner according to embodiments of the present invention can achieve full telecentric operation. This scanner achieves diffraction limited performance over the full optical +/−32 deg scan range at higher system apertures. This can be concluded from the spot diagram: all rays are well within the Airy spot circle, this is the definition of 'diffraction limited' performance. The Airy spot circle can be reduced in this case, and still have all the rays within the circle, so achieving diffraction limited performance at smaller Airy circles. The Airy circle becomes smaller (finer focus) when the system aperture is raised (thicker input beam).

Embodiments of the present invention hereinabove have been described with respect to a reflective type of deflector 61. Such reflective type of deflector can for example be of the galvo or polygon type. The present invention, however, is not limited to reflective type of deflector 61: it is also possible to use the two mirror optical scanner in accordance with embodiments of the present invention in combination with a transmissive type of deflector such as for instance a deflector of the acousto-optic or electro-optic type.

Figure 17:
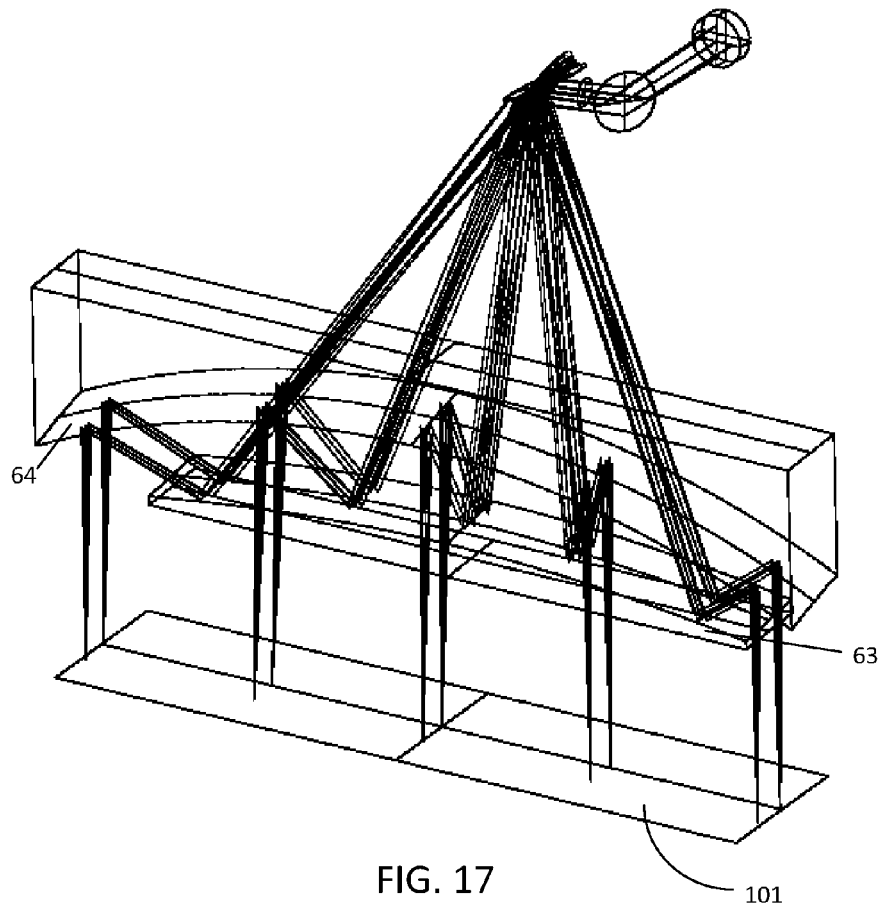
FIG. 17 is a 3D view of a reflective telecentric scanner according to embodiments of the present invention with a 2D deflector.

A scanner according to particular embodiments of the present invention is not limited to one dimensional scanning operation. Using a 2D type of scanner this unit can deliver excellent performance in a reasonable rectangular area. This results in scanners comprising two cross directed deflectors, e.g. two galvo type deflectors (as illustrated in FIG. 17), or a galvo and polygon combination. This latter solution is advantageous in that the polygon may provide the fastest and longest scanning motion and the galvo may create a smaller and slower cross directed scanning path. Alternatively an acousto-optic, electro-optic or piezo deflector can be utilized instead of the galvo (and in combination with a polygon) because for the cross scan deflector only a small angular deflection range is required.

In embodiments of the present invention, the weak focusing of the input beam could be incorporated in a reflective type of deflector 61, for example in case of a galvo mirror (or polygon mirror) the reflecting surface could have a non planar shape to provide for the focusing function. At the present time this is usually not done because of higher system cost.

A scanner according to embodiments of the present invention may in particular for example be used for material processing, e.g. laser material processing such as laser ablation. In laser material processing it is preferred to utilize a laser with a wavelength that matches the absorbance peak of the material to be ablated. It is an advantage of a scanner according to embodiments of the present invention that, due to the use of mirrors only in the optical system, its optical system is achromatic (scanning performance is not dependent on the wavelength used) and parfocal (focus plane is at the same location for all wavelengths). A scanner according to embodiments of the present invention is full telecentric (deviation from non-perpendicular condition is essentially 0 deg over the complete width of the scan line), meaning that the focussed radiation beam, e.g. laser beam, is always oriented perpendicular to the scanned surface. The advantage of a full telecentric scan is that matter-radiation interaction is the same everywhere along the scan path, hence not dependent on scan position.

Besides using high energy density levels to achieve the wanted surface effect (ablation), material processing also tends towards using short to very short pulsed lasers. These lasers may be operated in a pulsed mode, so the light is only on in a very short period of time (nano second to femto second range). During this very short period an utterly high energy level is available, although the average laser power usually does not get higher than 100 Watt. Laser material processing specialists tend to move to shorter pulsed lasers (at least as soon as the required energy level per pulse becomes available). The reason for this it to reduce the 'heat affected zone'. When using very short laser pulses, the heat cannot flow away in the lateral direction of the substrate, which results in very clean processed edges. While femto second pulsed lasers are now reaching the market, another optical effect prohibits their use in scanning systems: the effect, called 'pulse shape distortion', arises because the pulse width (in the time domain) is broadening when the beam passes through an optical medium, the amount of pulse broadening being directly related to the path length traversed through this medium. This is alleviated with a scanner according to embodiments of the present invention. In particular embodiments, in order to be able to be used with short laser pulsed sources, e.g. femto second pulsed lasers, a low group velocity dispersion (GVD) coating may be applied on the surfaces of the mirrors of the optical system.

Furthermore, a scanner according to embodiments of the present invention acts as a 'pulse width preserving' optical system.

Although the above description implies an 'output' scanner system, where some form of information is applied on the object in the flat field; embodiments of the present invention can also be used as an 'input' scanner system. In such a system, radiation, e.g. light, transmitted through or reflected by the observed object is transmitted through the scanner to a stationary light detector.

It is even possible to combine the 'output' and 'input' functionality of one scanner using the telecentric strip lens optical system according to embodiments of the present invention to investigate reflecting properties of an object. One example application is for instance detecting wafer defects, in which case an input light beam may be used for illuminating the wafer, a scanner being used for illuminating the wafer at different locations along a scan path (output scanner system), and light reflected by the wafer is transmitted through the same scanner to a stationary photodetector (input scanner). In this case the telecentric nature is highly desired because highly reflective materials tend to reflect close to the perpendicular direction of the surface, other materials have reflective properties that are highly angular dependent.

The foregoing description details certain embodiments of the invention. It will be appreciated, however, that no matter how detailed the foregoing appears in text, the invention may be practiced in many ways. While the invention has been illustrated and described in detail in the drawings and foregoing description, such illustration and description are to be considered illustrative or exemplary and not restrictive. It should be noted that the use of particular terminology when describing certain features or aspects of the invention should not be taken to imply that the terminology is being re-defined herein to be restricted to include any specific characteristics of the features or aspects of the invention with which that terminology is associated.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A scanning system comprising:
a first port for receiving or emitting a stationary beam of electromagnetic radiation,
a second port for emitting or receiving a scanning beam of electromagnetic radiation, the scanning beam scanning in a main scanning direction,
a scanning element for relaying the stationary beam into the scanning beam or vice versa,
an optical system between the scanning element and the second port,
wherein the optical system comprises a first mirror and a second mirror, each of the first mirror and the second mirror having a rotationally symmetric curved mirror surface about their optical axis, at least one of the first and the second curved mirror surface having an aspheric shape, and wherein the first and the second mirror have an off-axis decentered aperture where in use electromagnetic radiation is reflected and are offset in position with respect to one another in a direction perpendicular to the main scanning direction, the aspheric shape of the first and second mirror is optimized for telecentricity less than 5 degrees and line bow less than +20/−20 μm for mechanical scan angles up to +/−16 deg, and a spot size variation less than 5%.

2. The scanning system according to claim 1, wherein one of the first and the second curved mirror surface has an aspherical shape, and the other one of the first and second curved mirror surface has a spherical shape.

3. The scanning system according to claim 1, wherein both the first and the second curved mirror surface have an aspheric shape.

4. The scanning system according to claim 1, wherein the optical system consists of the first mirror and the second mirror.

5. The scanning system according to claim 1, wherein the optical system furthermore comprises at least one third mirror.

6. The scanning system according to claim 5, wherein the third mirror is a plane mirror.

7. The scanning system according to claim 1, furthermore comprising a radiation source for generating the stationary beam of electromagnetic radiation for being received by the first port.

8. The scanning system according to claim 7, furthermore comprising an optical subsystem near the first port comprising at least one optical element for adapting the diameter and divergence of the stationary beam of electromagnetic radiation that is entering the first port in such a way that the scanning beam emitted at the second port is focused on a scanned surface into a desired spot size.

9. The scanning system according to claim 7, wherein the aspheric surface of the at least one of the first mirror and second mirror being described in terms of conic and aspheric terms, wherein the position and curvature of the mirrors in the scanning system, the conic and aspheric terms in the description of the aspheric mirror surface(s) and the divergence of the radiation beam at the first port of said optical system are optimized to provide for a diffraction limited focused spot quality on a substantially straight scanned path on a scanned surface and to provide for the spot location along the scanned path having a near perfect linear ratio to a scanning element deflection angle.

10. The scanning system according to claim 9, wherein the mirror being located closest to the second port is of the concave type and has a length comparable to the length of the scanned path, and wherein the position and curvature of the mirrors, the conic and aspheric terms in the description of the aspheric mirror surface(s) and the divergence of the radiation beam at the first port are further optimized to provide for substantially telecentric scanning of the scanned path on the scanned surface.

11. The scanning system according to claim 1, furthermore comprising a substrate having a plurality of points each reflecting, transmitting or emitting electromagnetic radiation as a scanning beam towards the second port; and a detector for detecting radiation emitted as a stationary beam of electromagnetic radiation at the first port.

12. The scanning system according to claim 1, wherein the scanning element is a reflective system.

13. The scanning system according to claim 1, wherein the scanning element is a transmissive system.

14. The scanning system according to claim 1, wherein the scanning element comprises a two-dimensional deflector.

15. The scanning system according to claim 14, wherein the two-dimensional deflector comprises two cross-directed deflectors.

16. The scanning system according to claim 1, wherein the scanning system is configured to scan a surface with radiation from a source or to receive radiation reflected, transmitted or emitted from a scanned substrate.

* * * * *